Dec. 6, 1960

N. CORDIS 2,963,035

FLUID TREATING APPARATUS

Filed Dec. 31, 1956

Inventor.
Nat Cordis.
By Everett A. Johnson
Attorney.

Dec. 6, 1960
N. CORDIS
2,963,035
FLUID TREATING APPARATUS
Filed Dec. 31, 1956
3 Sheets-Sheet 2
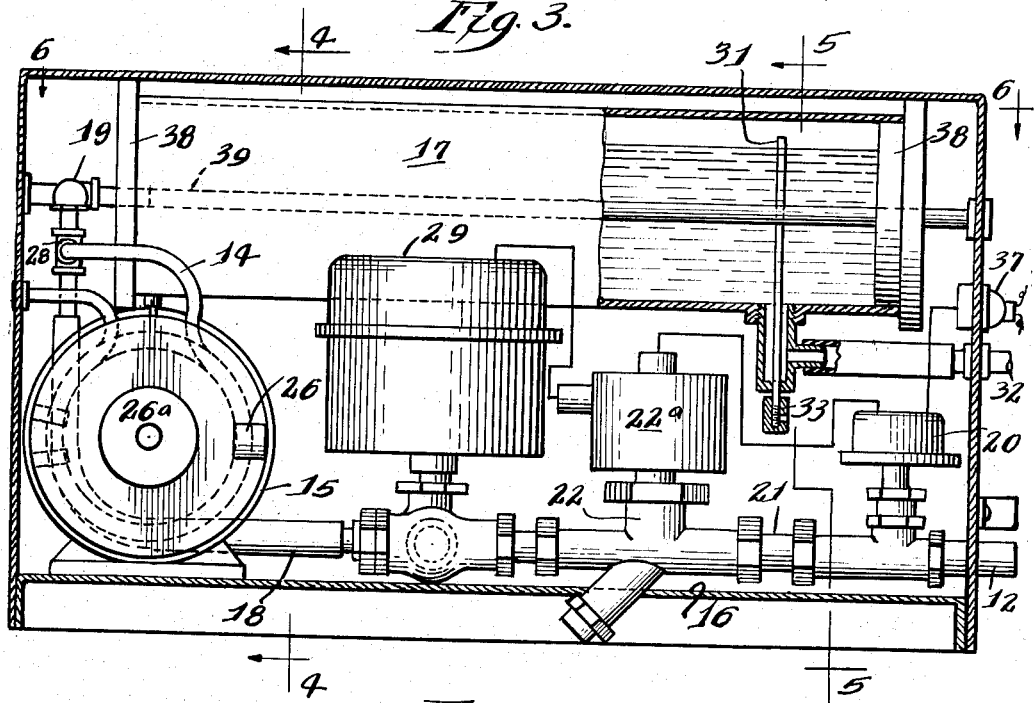
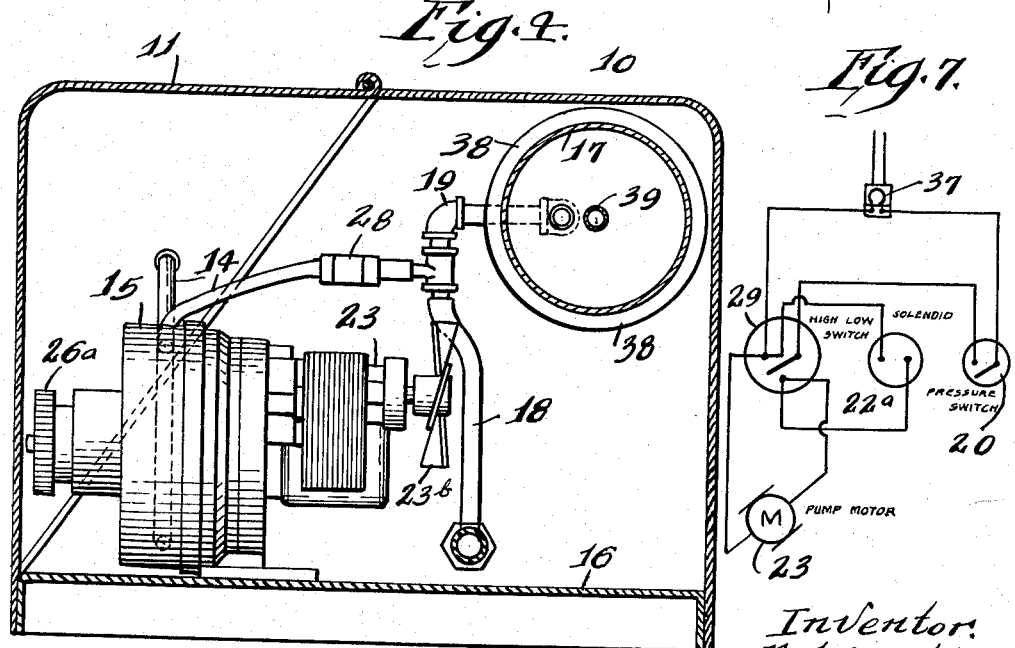
Inventor:
Nat Cordis.
By Everett A. Johnson
Attorney.

Dec. 6, 1960

N. CORDIS 2,963,035

FLUID TREATING APPARATUS

Filed Dec. 31, 1956

Inventor,
Nat Cordis.
By Everett A. Johnson
Attorney.

United States Patent Office 2,963,035
Patented Dec. 6, 1960

2,963,035

FLUID TREATING APPARATUS

Nat Cordis, Crown Stock Farm, Silver Lake, Wis.

Filed Dec. 31, 1956, Ser. No. 631,848

7 Claims. (Cl. 137—111)

This invention relates to fluid treating apparatus and particularly to apparatus for mixing a treating fluid with a flowing raw fluid in a preselected constant quantity. More particularly the invention relates to a system for medicating the drinking water of poultry which is dispensed from watering troughs having float-controlled inlet valves.

Many types of equipment have heretofore been proposed for feeding one fluid, including drugs, vaccines, sanitizing materials or feeding solutions, into a fluid stream such as water. Such prior systems have been complicated in construction, unreliable in operation, cumbersome to use, and not adapted for both portable and automatic continuous installations.

For these and other reasons it has heretofore been necessary when treatment of raw water with a second fluid has been desired, to pre-mix the bulk fluids in auxiliary tanks or receptacles and then to pump the mixture from the mixing tank to the distribution point. It has also been necessary to carefully proportion the treating fluid. Such batch operations are messy, wasteful, time-consuming, and not fool-proof even when done by skilled operators.

It is therefore a primary object of the present invention to provide new and novel apparatus for continuously and automatically treating raw water with a fluid medication. A further object of the invention is to provide a system for feeding a first fluid into the second fluid in constant quantity over a wide range of pressure and flow rate of a second fluid. Still another object of the invention is to provide apparatus for mixing a treating fluid with a raw fluid which is positive in its action and which can not deliver anything but the desired mixture.

An additional object of the invention is to provide an inexpensive and reliable device which is portable and rugged. It is also an object of the invention to provide an apparatus particularly adapted for use in medicating the drinking water of poultry and for delivering the treated water under line pressure into the water distribution system such as a system of drinking troughs having float-controlled inlet valves, etc. These and other objects of the invention will become apparent as my description thereof proceeds.

Briefly according to my invention the apparatus comprises a water inlet system with a constant flow rate valve, a pre-mix and pressure tank into which the water and medication are introduced, a pump for the medication discharging into the water system, a pressure switch up stream of the flow rate valve, a high-low range pressure switch between the tank and the flow rate valve control, an electrical circuit including an on-off solenoid flow valve on the inlet line and an electrical motor which drives the pump. The water flow rate valve and the constant displacement pump are arranged to deliver 1.5 gallons of water and 1.5 ounces of medication per minute. The on-off solenoid valve is open so long as the inlet pressure is at least 16 p.s.i. and so long as the tank pressure is maintained between 10 and 16 p.s.i.

The constant displacement pump is of the peristaltic type wherein a flexible tube is progressively and continuously compressed by a pressuring roller. The interlocking electrical controls assure flow of water at a uniform rate when the inlet pressure is above about 16 p.s.i. Thus there is some cycling of the level of water within the tank which dispenses uniformly treated mixture to the drinking troughs. When the troughs are filled to the proper level, the float valves associated with the drinking troughs shut off the flow from the apparatus causing the pressure to rise in the tank and when the pressure exceeds about 16 p.s.i. the pump stops and the flow of inlet water stops.

Other details and advantages of the invention will be described by reference to the accompanying drawings wherein:

Figure 3 is a front view partly in section;

Figure 4 is a section taken along the line 4—4 in Figure 3;

Figure 7 is a wiring diagram of the apparatus of Figures 3-6.

Figure 1:
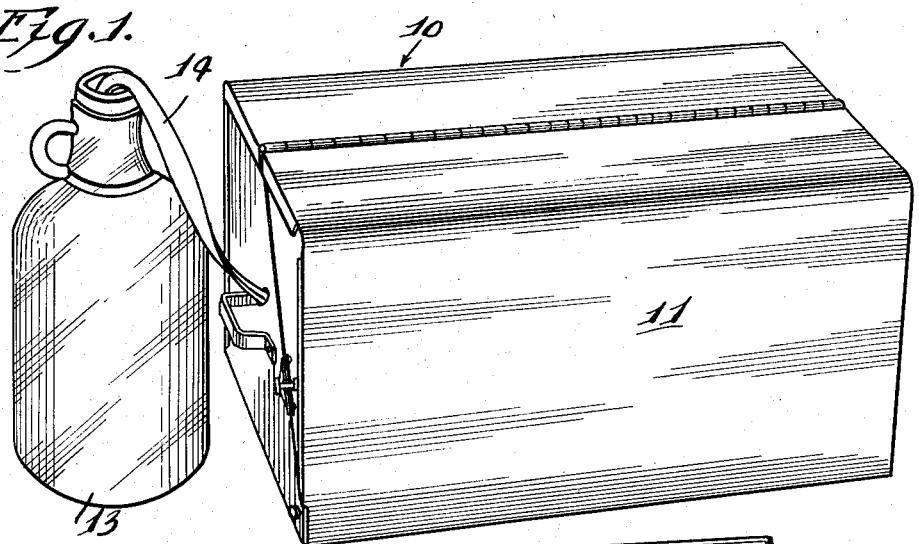
Figure 1 is an elevation showing the general appearance of the unit in operation.
Figure 2:
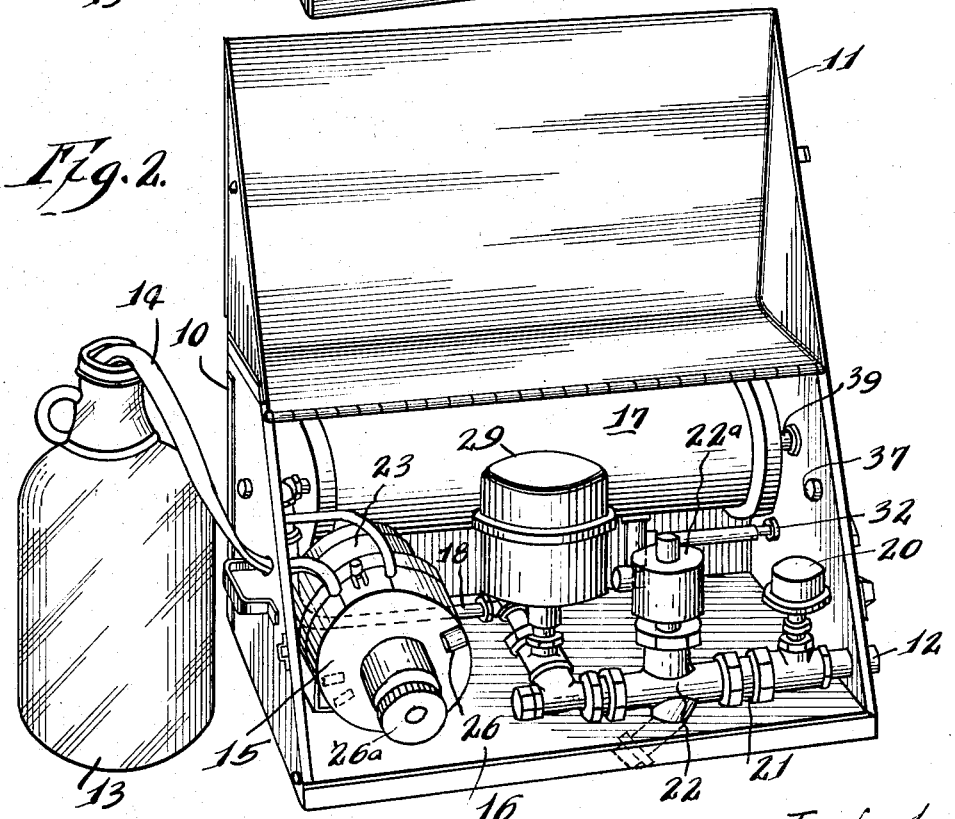
Figure 2 is an elevation with the cabinet lid raised to reveal the assembly from which the electrical leads have been omitted for clarity.
Figure 6:
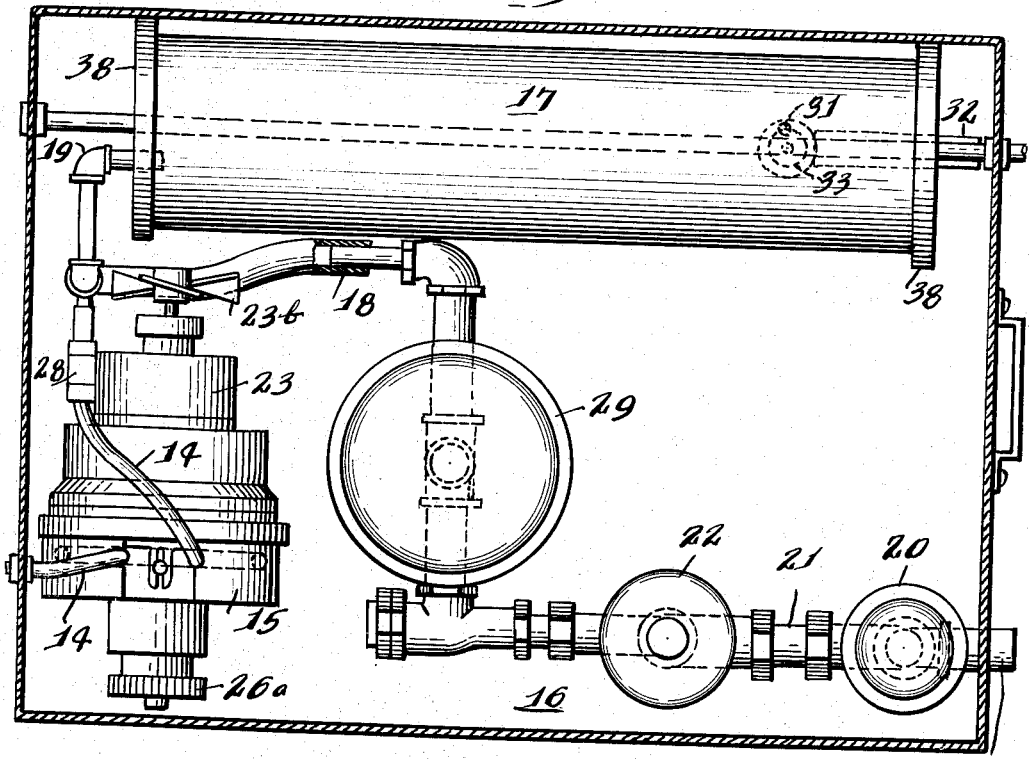
Figure 6 is a plan view taken along the line 6—6 in Figure 3.
Figure 5:
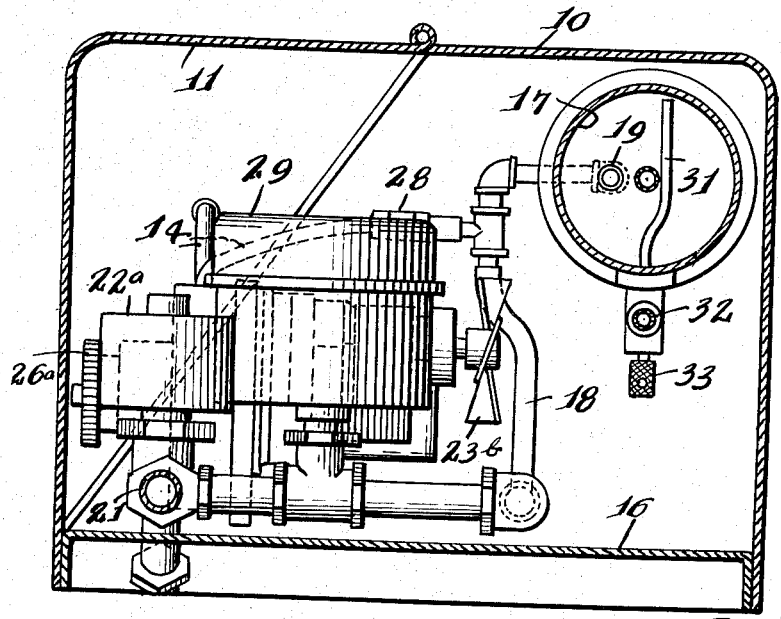
Figure 5 is another section taken along the line 5—5 in Figure 3.

Referring to the drawings, the apparatus includes a cabinet 10 having the hinged cover 11. The liquid to be treated, such as water, is supplied to inlet line 12 by suitable piping and couplings not shown. The treating fluid such as a drug, vaccine, or feed solution is stored in a reservoir such as a bottle 13. A length of tubing 14 dips into the reservoir 13 and is connected to the pump 15 mounted on the base 16 of the cabinet 10.

Within the cabinet 10 is a tank 17 which receives the combined flow of the outlet of tubing 14 and the full flow in line 18 leading from the inlet 12 to the fitting 19 in the tank 17. On line 18 is a pressure switch 20 which completes the electrical control circuit only if the water pressure meets a preselected minimum such as at least 16 p.s.i. The water then flows through flow rate valve 21 and solenoid control valve 22. The flow rate valve 21 meters a fixed volume of water through the line 18, for example 1.5 gallons per minute, so long as the pressure at the inlet is above about 16 p.s.i.

The control valve 22 on line 18 will be closed by releasing the solenoid 22a when the pressure switch breaks the circuit in the event the water pressure drops below the preset level. Simultaneously the current to the constant speed motor 23 which drives the pump 15 is interrupted and no medication is delivered when there is no flow of water.

The peristaltic pump 15 contains a driven roller-disc 26, and the tubing 14 which is progressively compressed by the roller-disc 26 as it is rotated by the motor 23. The discharge end of the tubing 14 may be connected to a fitting containing a check valve 28 and then into the line 18. The check valve 28 prevents a back flow from the water line 18 in the event of a failure of the pump 15, such as a bursting of the tubing 14 which might occur. In such event, however, the flow of water continues under the control of the pressure switches 20 and 29 so that the poultry is not deprived of its normal water supply.

The combined flow of water and medication enters the tank 17 mounted within the cabinet 10 by tank inlet 19 and expels any air therein through vent tube 31 extending through the outlet line fitting 32 and having a threaded cap 33. Initially the cap 33 is loosened to vent the tank 31 and then closed to build up pressure in the tank 17. It will be understood that the outlet line 32 leads to a water trough having a valving system of some kind such as a float valve and that when flow stops from the outlet line 32 the water level rises in the tank 17 and drives the air therefrom through the vent tube 31.

As the pressure deviates from the selected range in the tank 17, and hence in the system including line 18, the high-low pressure switch 29 is actuated to break the circuit and this closes the control valve 22 and stops the pump 15 by stopping the motor 23. This may occur when the pressure drops below 10 p.s.i. and when the pressure exceeds 16 p.s.i.

Reverting to the pump 15, the disc 26 is driven by motor 23 through shaft 23a, the motor 23 being air-cooled by fan 23b. The tubing 14 is placed within an annular trough or groove in the bed of the pump housing behind the disc 26 and a contact ring may be interposed the roller-disc 26 and the tubing 14 to minimize wear and achieve uniform compression of the tubing 14. The knob 26a is fixed to the drive shaft 23a and a compression spring within the knob 26a exerts pressure on the disc 26 which is keyed to the shaft 23a.

Referring to Figure 7, 24 volt A.C. current is applied to the apparatus and the series circuit includes the pressure switch 20, the solenoid 22a operating the control valve 22, the high-low switch 29, and the pump motor 23. The connector 37 in the wall of the cabinet 10 receives the leads from a transformer (not shown) which may be provided to convert the 110 v. A.C. current to 24 volts. Alternatively a battery means may be used to supply the power to the system.

The storage tank 17 as shown comprises a tube closed at its ends by caps 38 held in place by the tie rod 39 which also supports the tank assembly within the cabinet 10 by being fixed through the walls thereof. It is preferred that the tank be of inert plastic material and that the flow line 18 and the tubing 14 be similarly constructed. In this way the medication from the reservoir 13 does not come into contact with any metal until after it is thoroughly mixed with water.

Where vaccination and other programs are to be instituted through the drinking water, it is best to have a break in the line of each poultry house. The portable automatic drug dispenser can even be used in a single room by attaching a water hose from a faucet into the room to the machine; then the water outflow line on the drug dispenser can be connected to one or more drinking fountains in the room.

This system can be used for spraying disinfectants when the poultry house room is being cleaned and disinfected. The hose is fastened from the water line into water inflow line 12 and then a section of hose is fixed to the water outflow line 32. By putting a nozzle on the end of this hose one can spray and disinfect a poultry house easily and quickly. A liquid quaternary ammonium disinfectant is ideal for this purpose.

Although I have described my invention with reference to a preferred embodiment thereof, it should be understood that this is by way of illustration only and that commercially available components performing the indicated functions of the schematically shown components will be supplied by those skilled in the art without departing from my invention. Further, modifications in the apparatus will become apparent to those skilled in this art and can be made in view of my teaching without departing from the spirit and scope of the described invention.

What I claim is:

1. Fluid treating apparatus comprising a dispensing container having an inlet line and an outlet, a constant flow rate valve located in said inlet line, a treating agent fluid line connected to said inlet line adjacent the point where the inlet line joins said container, electrically driven constant volume pump means in said treating agent line and pressure-responsive electrical switch means on said inlet line operated upon attaining desired pressure range conditions within said line in pressure communication with said container, said switch means controlling said pump means.

2. The apparatus of claim 1 which includes a solenoid flow control valve means for said fluid to be treated and a second pressure-responsive electrical switch means for closing said valve irrespective of continued closure of said first electrical switch means.

3. The apparatus of claim 1 wherein the pump means is of the peristaltic tube type including a fixed loop of tubing in a housing, and a rotated pressure plate having a roller means for progressively collapsing a section of the tubing to continuously deliver the agent at a measured rate.

4. In an apparatus for introducing a measured quantity of a treating agent into a flowing stream of liquid which comprises in combination a flow line for said stream of liquid, an electrically driven constant volume pump means, a treating agent fluid line connected to the flow line and to the said pump means, pressure-responsive switch means on said flow line, a constant flow rate valve in the said flow line, solenoid shut-off valve means on said flow line, said solenoid valve means and said electrically driven pump means being controllable by said pressure-responsive switch means to assure the blending of treating agent with said liquid only when the proper pressure and flow conditions are maintained.

5. A portable apparatus for treating a raw liquid with a fluid agent which comprises in combination a flow line flowing the raw liquid, a constant flow rate valve in said flow line, constant volume pump means for introducing a treating agent into said flow line, a mixing chamber located in said flow line, a treating agent line connecting said pump and the inlet of said mixing chamber, a delivery line communicating with the mixing chamber for dispensing the mixture of treating agent and raw fluid therefrom, pressure-responsive electrical switch means adapted to operate said pump only when the pressure in the said flow line is within the desired pressure range and means in the flow line controlled by the said pressure-responsive electrical switch means to open and close said flow line.

6. A portable drug dispenser for use with poultry watering systems which comprises in combination a water inlet conduit means, a constant flow rate valve in said conduit, drug supply means, a closed tank means connected to said inlet conduit means, said drug supply means including a line connected to said conduit means, a constant displacement electrically-driven pump on said drug supply line and delivering the drug from said supply means into the said conduit means between said tank and said flow rate valve, a pressure switch on said conduit upstream of the flow rate valve, a high-low range pressure switch on said conduit between the tank inlet and the flow rate valve control, an on-off solenoid flow valve on the said conduit, and a normally closed electrical circuit means including said pressure switch, said high-low range pressure switch, said solenoid flow valve, and said electrically driven pump, said pressure switches being adapted to remain closed only when the proper flow of water at the desired pressure exists, and when the pressure in the said inlet conduit means is in the selected range.

7. Apparatus for automatically mixing different fluids and delivering the mixture under pressure to a distributing system which comprises in combination a closed dispensing tank, first fluid conduit means connected to said tank, constant flow rate means on said conduit means, a first pressure-responsive switch means on said conduit means, a solenoid-operated flow control valve on said conduit, electrically driven constant volume pump means, second fluid line means connected between said pump and said conduit means, and a second high-low pressure-responsive switch means on said conduit means, said first pressure responsive switch means being adapted to control said solenoid flow control valve and said second high-low range switch means being adapted to control said electrically driven pump, said first and second switch means, said solenoid, and said pump being connected in a single electrical circuit so that only the mixed fluid of the desired proportions can be dispensed and the failure to attain the proper pressure or the desired rate of flow of the first fluid in said conduit means shuts down the apparatus completely.

References Cited in the file of this patent

UNITED STATES PATENTS

| | | |
|---|---|---|
| 1,022,029 | Kingswell | Apr. 2, 1912 |
| 2,024,480 | Short | Dec. 17, 1935 |
| 2,203,980 | Burt | June 11, 1940 |
| 2,270,146 | Steele | Jan. 13, 1942 |
| 2,275,638 | Miner | Mar. 10, 1942 |
| 2,768,638 | Henke | Oct. 30, 1956 |